United States Patent [19]
Furlani et al.

[11] Patent Number: 5,710,747
[45] Date of Patent: Jan. 20, 1998

[54] DUAL COIL, TRANSLATIONAL BIAS-FIELD DEVICE FOR A MAGNETO-OPTICAL SYSTEM

[75] Inventors: Edward P. Furlani, Lancaster; Bijan Barzideh, Rush; Svetlana Reznik; Christopher C. Williams, both of Rochester, all of N.Y.

[73] Assignee: Eastman Kodak Company, Rochester, N.Y.

[21] Appl. No.: 766,195

[22] Filed: Dec. 12, 1996

[51] Int. Cl.$^6$ .................................................. G11B 11/00
[52] U.S. Cl. .............................................. 369/13; 360/114
[58] Field of Search .................. 369/13, 14; 300/114, 300/59, 103, 102, 46; 365/122

[56] References Cited

U.S. PATENT DOCUMENTS

| | | | |
|---|---|---|---|
| 4,972,337 | 11/1990 | Eguchi et al. | 369/13 |
| 4,984,226 | 1/1991 | Kobori | 369/13 |
| 5,020,042 | 5/1991 | Fearnside et al. | 369/13 |
| 5,291,345 | 3/1994 | Umeda et al. | 360/59 |
| 5,490,124 | 2/1996 | Oliver et al. | 369/13 |
| 5,535,181 | 7/1996 | Furlani et al. | 369/13 |
| 5,619,479 | 4/1997 | Furlani et al. | 369/13 |

*Primary Examiner*—Tan Dinh
*Attorney, Agent, or Firm*—Peyton C. Watkins

[57] ABSTRACT

A translational, bias-field device for a magneto-optical system having a magneto-optical recording element moving through a first magnetic field created by the bias-field device so that information is selectively recorded on or erased from the recording element, the device comprises a housing and a first rail for enabling translational movement attached to said housing. A permanent magnet structure is polarized through its cross-section having a first set of north and south poles on a first surface positioned adjacent the magneto-optic recording element for providing the first magnetic field to the recording element, and a second set of north and south poles on a second surface, and the permanent magnet structure attached to the first rail which enables translational movement of the magnet structure. A first coil is positioned adjacent to the magnet which, when energized, imparts a second magnetic field to the permanent magnet structure for imparting motion to the permanent magnet structure, and a second coil is positioned adjacent to the magnet which, when energized, imparts a third magnetic field to the permanent magnet structure for also imparting motion to the permanent magnet structure.

9 Claims, 3 Drawing Sheets

DUAL COIL, TRANSLATIONAL BIAS-FIELD DEVICE FOR A MAGNETO-OPTICAL SYSTEM

CROSS-REFERENCE TO RELATED APPLICATIONS

The present application is related to U.S. application Ser. No. 08/419,574, filed Apr. 10, 1995, by Edward P. Furlani et al., and entitled, "A PERMANENT MAGNET DEVICE FOR SELECTIVELY INVERTING A MAGNETIC BIAS FIELD FOR MAGNETO-OPTIC RECORDING", and also related to U.S. application Ser. No. 08/583,164, filed Jan. 4, 1996, by Edward P. Furlani et al., and entitled, "A TRANSLATIONAL, BIAS FIELD DEVICE FOR A MAGNETO-OPTICAL SYSTEM."

FIELD OF THE INVENTION

The invention relates generally to the field of magneto-optic recording and erasing and, more particularly, to such recording and erasing utilizing a translational bias-field device having a dual coil for inverting a bias field for permitting recording and erasure.

BACKGROUND OF THE INVENTION

In the magneto-optic recording process, a vertically magnetizable recording layer is initially sensitized by simultaneously subjecting it to a uniform magnetic field and a temperature which exceeds its Curie temperature (e.g., 400 degrees C.). The magnetic field, being directed perpendicular to the recording layer, serves to uniformly align all of the magnetic domains therewith. Once all the magnetic domains are facing in the same direction, the recording layer is ready to record information. Such recording is effected by subjecting the recording layer to a magnetic field of reverse polarity while scanning the layer with an intensity-modulated laser beam.

During the recording process, a laser beam intensity is switched between high and low levels, representing the digital (binary) information being recorded. Only the high level is sufficiently intense to raise the temperature of the irradiated portion of the recording layer to above its Curie temperature; thus, digital information is recorded at the point of incidence of the laser as the more intensely irradiated magnetic domains flip in orientation to align themselves with the magnetic bias field. Playback of the recorded information is commonly achieved by scanning the information tracks with a plane-polarized beam of radiation and monitoring the reflected beam for shifts in the plane of polarization, as produced by the well known Kerr effect. To erase the recorded information, the polarity of the applied external magnetic field is reversed, and the recording layer is scanned with a beam of sufficient intensity to again heat the recording layer to above its Curie temperature. After this erasure step, all of the irradiated magnetic domains will again face in the same direction.

Various schemes have been proposed to achieve the magnetic field inversions required in switching between the record and erase modes of the magneto-optic recording process. In the disclosures of U.S. Pat. Nos. 5,020,042 and 5,291,345, for example, the field inversion apparatus consists of a magnetic field producing coil surrounding a cylindrical bipolar magnet. One pole of the magnet is placed adjacent the recording medium for inducing its particular magnetization to the recording medium, and when the coil is energized, the field that the coil creates imparts a torque to the magnet forcing it to rotate for causing the other pole of the magnet to be adjacent the recording medium.

U.S. application Ser. No. 08/583,164 filed Jan. 4, 1996, by Edward P. Furlani et al., and entitled, "A TRANSLATIONAL, BIAS FIELD DEVICE FOR A MAGNETO-OPTICAL SYSTEM" discloses a translational bias field device having a single coil positioned adjacent a permanent magnet for imparting motion to the permanent magnet.

Although the presently known and utilized devices are satisfactory, they are not without drawbacks. In U.S. Pat. Nos. 5,020,042 and 5,291,345, the rotation of the magnet requires it to be accurately positioned so that the proper pole is adjacent the recording medium, and so that the desired pole does not over-rotate or under-rotate causing the desired pole to be positioned non-perpendicular to the recording medium, which reduces the magnetic strength of the bias field. In addition, improvements, such as response time of the magnetic field inversion, are always desirable. In U.S. application Ser. No. 08/583,164, the single coil provides efficient operation but only for a limited range of travel of the bias magnet.

Consequently, a need exists in the construction and mode of operating the bias-field device so as to overcome the above-described drawbacks.

SUMMARY OF THE INVENTION

It is an object of the present invention to provide a bias-field device having accurate pole positioning and a fast response time.

It is also an object of the present invention to provide an efficient device for extending the range of travel of the bias magnet.

It is an advantage of the present invention to provide a bias-field device which is efficient to produce.

It is a feature of the present invention to provide a first coil positioned adjacent to the magnet which, when energized, imparts a second magnetic field to the permanent magnet structure for imparting motion to the permanent magnet structure; and to provide a second coil positioned adjacent to the magnet which, when energized, imparts a third magnetic field to the permanent magnet structure for also imparting motion to the permanent magnet structure.

The present invention is directed to overcoming one or more of the problems set forth above. Briefly summarized according to one aspect of the invention, the invention resides in a translational, bias-field device for a magneto-optical system having a magneto-optical recording element moving through a first magnetic field created by the bias-field device so that information is selectively recorded on or erased from the recording element, the device comprising (a) a housing; (b) a first rail for enabling translational movement attached to said housing; (c) a permanent magnet structure polarized through its cross-section having a first set of north and south poles on a first surface positioned adjacent the magneto-optic recording element for providing the first magnetic field to the recording element, and a second set of north and south poles on a second surface, and said permanent magnet structure attached to said first rail which enables translational movement of said magnet structure; (d) a first coil positioned adjacent to said magnet which, when energized, imparts a second magnetic field to said permanent magnet structure for imparting motion to said permanent magnet structure; and (e) a second coil positioned adjacent to said magnet which, when energized, imparts a third magnetic field to said permanent magnet structure for also imparting motion to said permanent magnet structure.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

Figure 1:
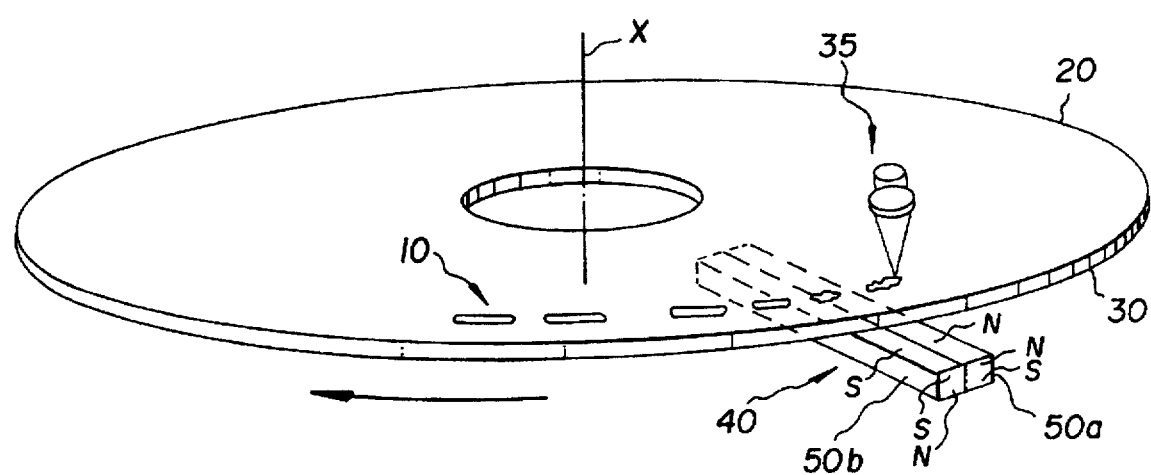
FIG. 1 is a perspective view of a recording medium having the bias-field device of the present invention.

In the following description, like reference characters designate like or corresponding views of the drawings. Also in the following description, it is to be understood that such terms as "forward," "rearward," "left," "right," "upwardly," "downwardly," and the like are words of convenience and are not to be construed as limiting terms.

Referring to FIG. 1, there is illustrated a magneto-optic recording element as shown in the form of a disk 10 which is adapted to be rotated about its central axis x. The essential features of the recording element are a vertically magnetizable recording layer 20 and a supporting substrate 30. During the recording step, the recording layer 20 is selectively heated by a beam of radiation, as provided by a laser source 35. The beam intensity is modulated by an information source (not shown) representing certain digital information which is to be recorded. The information source functions to switch the beam intensity of the laser source 35 between high and low levels, only the high level being sufficient to heat the recording layer 20 to at least its Curie temperature. A bias field device 40 (of which only a portion is shown in FIG. 1) includes two abutting, rectangular-shaped magnets 50a and 50b both having north and south poles oriented along their cross-sectional dimension, and is radially disposed with respect to the rotating disk 10 for providing a magnetic bias-field at recording layer 20. The magnets 50a and 50b are mounted for translational movement, as will be described in detail below, so that the direction of the field under the desired location on the recording medium 10 may be switched from the downward direction in which magnet 50a is beneath the write/erase spot on recording layer 20 to an upward direction in which the bias-field device 40 is translationally moved so that magnet 50b is beneath the write/erase spot on recording layer 20. The magnets 50a and 50b will cause magnetic domains in the recording element to flip orientations, e.g., from upward to downward, whenever the laser beam intensity is at its high level. In this manner, the digital information provided by the laser source 35 is magnetically recorded in the recording layer 20.

To erase the previously recorded information in the recording layer 20, the direction of the magnetic bias field is inverted. After such field inversion, the laser source 35 scans the recording element while its intensity is maintained at its high level. While so radiated, all of the magnetic domains align themselves with the bias field thereby providing a uniformly sensitized disk or track which is again ready to record information.

Figure 2:
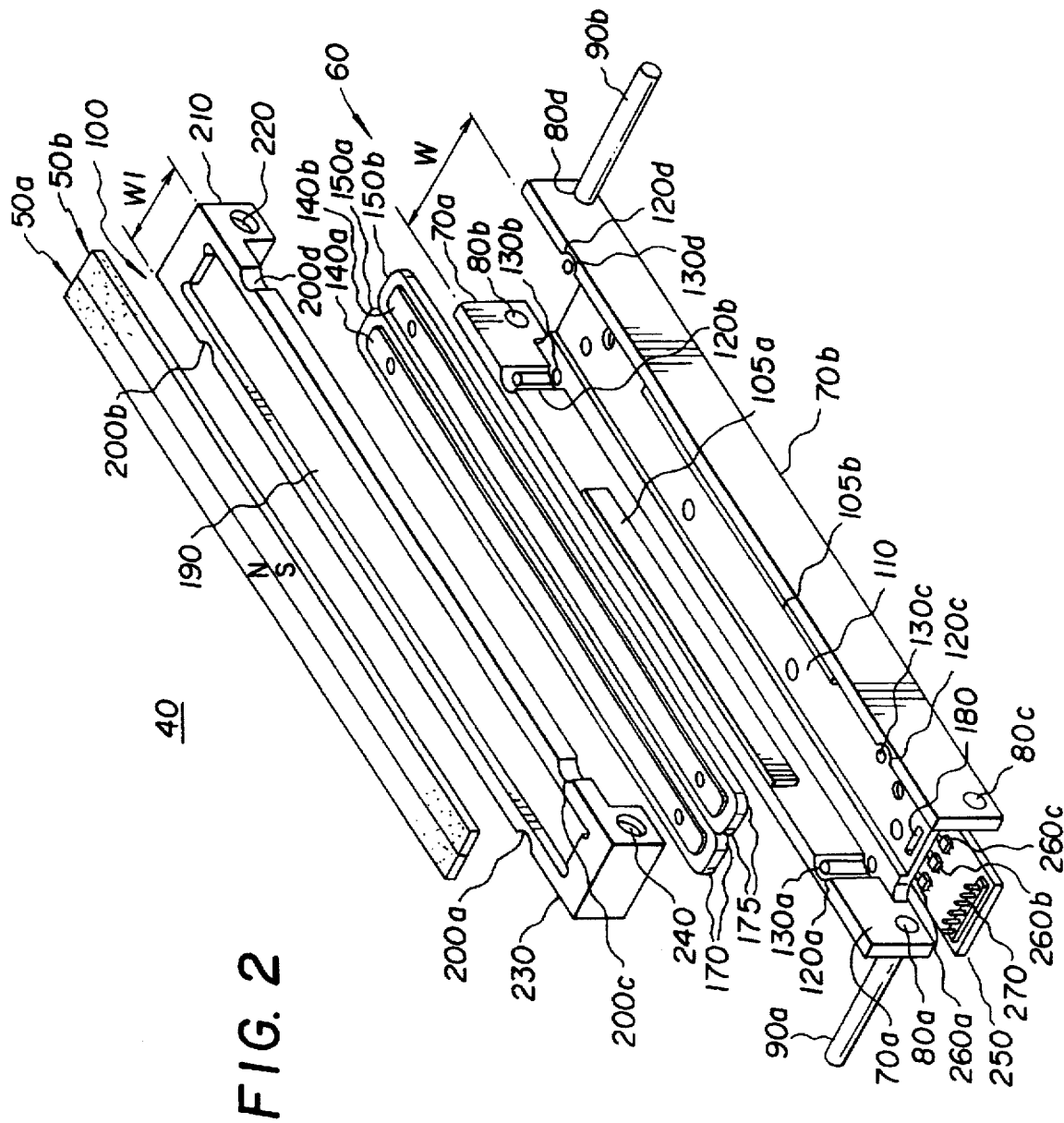
FIG. 2 is a perspective view of the bias-field device illustrating its assembly.

Referring to FIG. 2, the bias-field device 40 is shown in detail. The device 40 includes a housing 60 having two metallic sides 70a and 70b positioned in a substantially parallel, spaced-apart relationship. Each side 70a and 70b contains two spaced-apart holes 80 with the holes 80a and 80b on side 70a respectively aligned in registry with the holes 80c and 80d on the other side 70b for permitting each pair of aligned holes (i.e., 80a to 80c and 80b to 80d) to receive a stud 90 for permitting the housing 60 to be attached to a plastic portion 100, as will be described in detail below. Each side 70a and 70b respectively includes a shock-absorbing pad 105a and 105b for absorbing the impact of the plastic portion 100 abutting against the housing 60 during the movement of the plastic portion 100 and the magnets 50a and 50b, as will later become more apparent.

A metallic housing bottom 110 rests between the sides 70, and is integrally formed with the sides 70 so as to form one solid portion or may attached to the sides 70 at their lower portion by a suitable metallic adhesive. The bottom 110 maintains a width (W) between the two sides 70, and each side 70 contains two spaced-apart, notched-out portions 120 having the same spacing therebetween on both sides 70. A metal post 130 is disposed in each notch 120 for attracting the magnets 50a and 50b when they are positioned in the housing 60, as will later become more apparent.

Two rectangular-shaped, non-metallic (such as plastic) centerpieces 140a and 140b are both attached to the housing bottom 110 by a suitable adhesive, and two closed-loop, electrical coils 150a and 150b are respectively wound around each centerpiece 140a and 140b for both receiving electrical current from a suitable direct current source (not shown), which are well known in the art. The coils 150a and 150b include two lead ends 170 and 175 for connection to the current source (not shown) and they all pass through a slot 180 in the housing 60 for permitting access to the current source. The coils 150a and 150b, when energized, each create a magnetic field, the direction of which is periodically alternated by reversing the direction of the current; therefore, the current source should include the capability to switch the direction of the currents supplied to the coils 150a and 150b for permitting this field inversion.

The low friction plastic 100, such as lubricated polycarbonate (such as that manufactured by LNP Engineering Plastics Corporation), includes a hollowed-out center portion 190 which receives the magnets 50a and 50b as the plastic portion 100 is placed onto the housing 60. It is instructive to note that the plastic portion 100 is smaller in width (W1) than the width (W) of the housing 60 so the lateral movement is permitted. The plastic portion 100 includes four pockets 200 respectively positioned to correspond to the locations of the four notched-out portions 120 so that when the plastic portion 100 is placed on the housing 60 each notched-out portion 120 and its corresponding pocket 200 forms a generally circular hollowed-out section for receiving a post 130. One end of the plastic portion 100 includes an enlarged portion 210 having a hole 220 therethrough which is in registry with two holes 80b and 80d in the housing 60 for receiving a stud 90b for attaching the housing 60 to the plastic portion 100. The other end portion 230 also includes a hole 240 therethrough in registry with two holes 80a and 80c in the housing 60 for receiving the other stud 90a for further attaching the housing 60 to the plastic portion 100.

A circuit board 250 is attached to one end of bottom portion 110 and includes three Hall sensors 260a, 260b, and 260c for sensing the position of magnets 50a and 50b, as will be described in detail below. The circuit board 250 also includes a connector 270 that connects the Hall sensors to control electronics (not shown).

Finally, the magnets 50a and 50b are placed in the hollowed-out portion 190 and are secured thereto by a suitable epoxy (not shown). It is instructive to note that the plastic portion 100 can move translationally on the studs 90a and 90b which, in turn, permits translation of the magnets.

Figure 3A:
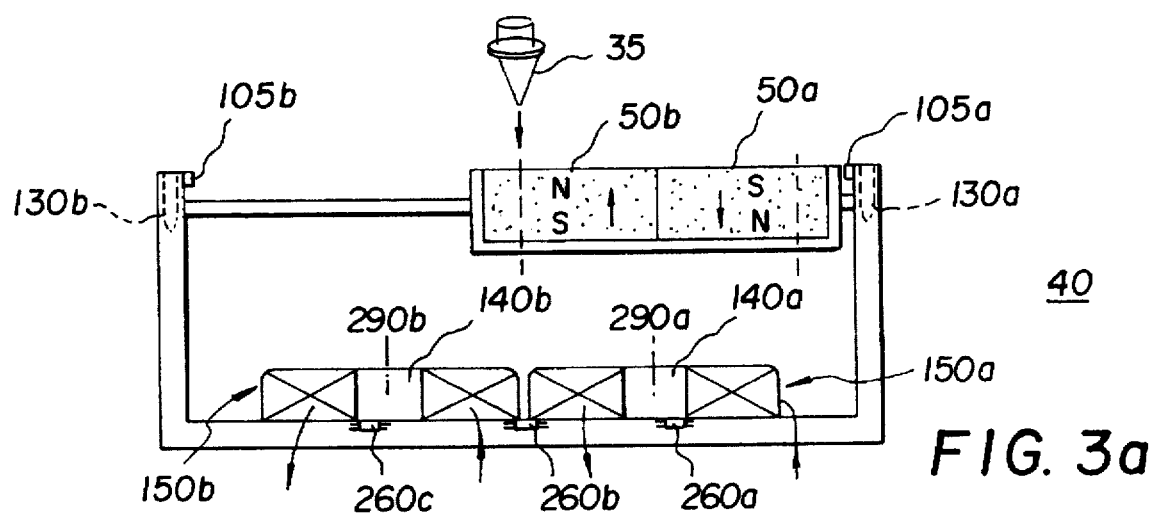
FIG. 3A is a view in vertical cross section of the bias-field device.
Figure 3B:
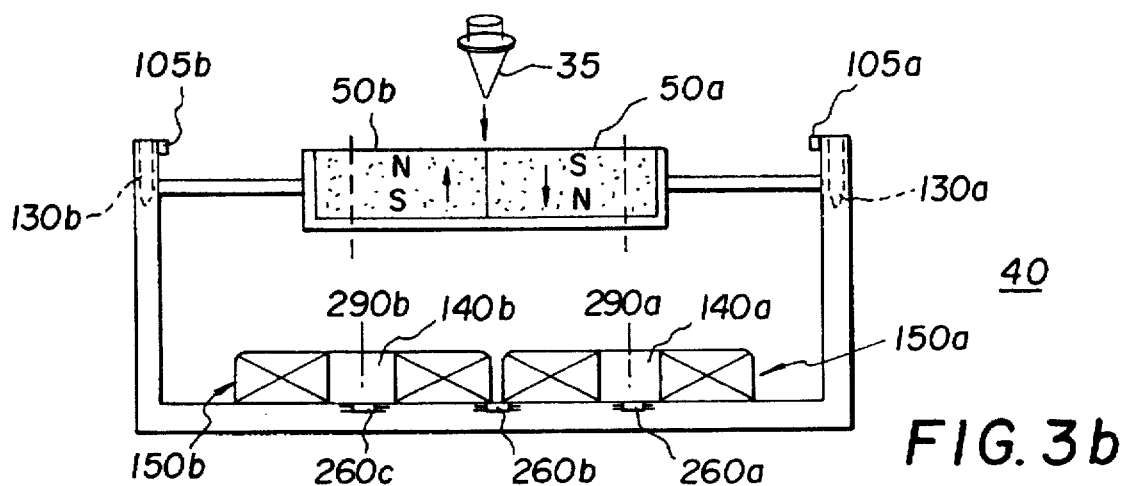
FIG. 3b is also a view in vertical cross section of the bias-field device.
Figure 3C:
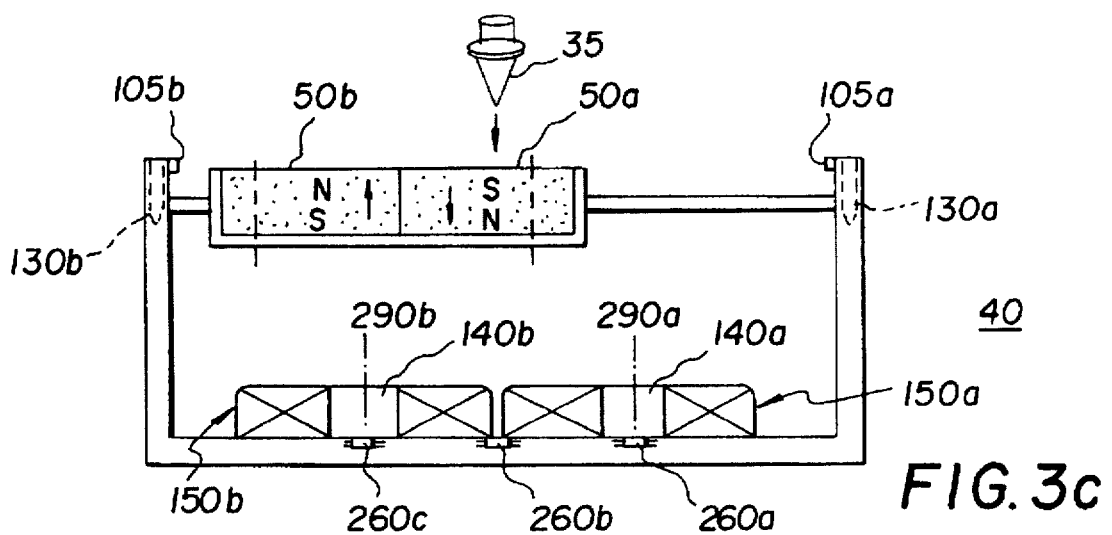
FIG. 3C is still a further a view in vertical cross section of the bias-field device.

Referring to FIGS. 3a, 3b and 3c, an illustration of the operation of the bias-field device 40 is shown. The coils 150a and 150b are energized in a synchronous fashion with a direct current, typically between 100 and 300 milliamps, for creating a magnetic field as follows: Referring now to FIG. 3a, when the magnets 50a and 50b are in the extreme right position, the Hall sensors 260a and 260b respectively detect a north and south pole of the magnets 50a and 50b. The control electronics (not shown) detects the output of Hall sensors 260a and 260b and upon detecting this configuration of outputs, is programmed to cause current to flow from the power source (not shown) through coils 150a and 150b as follows: The coil 150a is energized such that a south pole is formed at the top center portion 290a of coil 150a for imparting a leftwardly force to magnets 50a and 50b caused by the respective repulsion and attraction of the poles at the lower portion of magnets 50b and 50a. Simultaneous to energizing coil 150a, coil 150b is energized such that a north pole is formed at the top center portion 290b of coil 150b, thereby imparting a leftwardly force to magnet 50b. It is instructive to note that Hall sensor 260c does not detect any pole of the magnets 50a and 50b, and consequently, the control electronics do not detect an output from Hall sensor 260c.

Referring now to FIG. 3b, when magnets 50a and 50b reach the midpoint of their travel, Hall sensors 260a, and 260b still respectively detect a north and south pole of the lower portions of magnets 50a and 50b, and Hall sensor 260c detects the south pole at the lower portion of of magnet 50b. The control electronics detects the output of Hall sensors 260a, 260b and 260c, and upon detecting this configuration of outputs, is programmed to cause current to flow from the power source through coils 150a and 150b as follows: The coil 150a is de-energized such that no magnetic force is formed at the top center portion 290a of coil 150a. The coil 150b is still energized such that a north pole is formed at the top center portion 290b of coil 150b for imparting a leftward force to magnet 50b caused by the attraction of the bottom pole of magnet 50b.

Referring now to FIG. 3c, as magnets 50a and 50b move across coil 150b to the position shown in FIG. 3, Hall sensor 260a will not detect any field while Hall sensors 260b and 260c respectively detect a north and south pole of the lower portions of magnets 50a and 50b. The control electronics detects the output of Hall sensors 260a, 260b and 260c, and upon detecting this configuration of outputs, is programmed to cause current to flow from the power source through coils 150a and 150b. The coil 150a is energized such that a north pole is generated at the top center portion 290a for repelling the north pole at the lower portion of magnet 50a. The coil 150b is energized such that a south pole is formed at the top center portion 290b of coil 150b for imparting a leftwardly force to magnet 50b caused by the repulsion of the bottom south pole of magnet 50b. This ultimately forces the magnets 50a and 50b to the extreme left position.

When both coils are de-energized, the posts 130a and 130b are for maintaining the magnets in either the rigrt extreme position or left extreme position of the housing 60 due to magnetic coupling.

To move the magnets 50a and 50b from the extreme left back to the extreme right position as shown in FIG. 3a, the above described sequence f events is reversed as is well known in the art.

The invention has been described with reference to a preferred embodiment. However, it will be appreciated that variations and modifications can be effected by a person of ordinary skill in the art without departing from the scope of the invention.

| Parts List: | |
| --- | --- |
| 10 | disk |
| 20 | recording layer |
| 30 | substrate |
| 35 | laser source |
| 40 | bias field device |
| 50a | magnet |
| 50b | magnet |
| 60 | housing |
| 70 | side |
| 70a | side |
| 70b | side |
| 80 | hole |
| 80a | hole |
| 80b | hole |
| 80c | hole |
| 80d | hole |
| 90 | stud |
| 90a | stud |
| 90b | stud |
| 100 | plastic |
| 105a | shock absorbing pad |
| 105b | shock absorbing pad |
| 110 | housing bottom |
| 120 | notch |
| 130 | post |
| 130a | post |
| 130b | post |
| 130c | post |
| 130d | post |
| 140a | centerpiece |
| 140b | centerpiece |
| 150a | coil |
| 150b | coil |
| 170 | lead ends |
| 175 | coil leads |
| 180 | slot |
| 190 | hollowed-out center |
| 200 | pockets |
| 210 | enlarged portion |
| 220 | hole |
| 230 | t-shaped portion |
| 240 | hole |
| 250 | circuit board |
| 260a | hall sensor |
| 260b | hall sensor |
| 260c | hall sensor |
| 270 | connector |
| 290a | center portion of coil 150a |
| 290b | center portion of coil 150b |

We claim:

1. A translational, bias-field device for a magneto-optical system having a magneto-optical recording element moving through a first magnetic field created by the bias-field device so that information is selectively recorded on or erased from the recording element, the device comprising:

(a) a housing;

(b) a first rail for enabling translational movement attached to said housing;

(c) a permanent magnet structure polarized through its cross-section and having a first set of north and south poles on a first surface positioned adjacent the magneto-optic recording element for providing the first magnetic field to the recording element, and a second set of north and south poles on a second surface, and said permanent magnet structure attached to said first rail which enables translational movement of said magnet structure;

(d) a first coil positioned adjacent to said magnet structure which, when energized, imparts a second magnetic field to said permanent magnet structure for imparting motion to said permanent magnet structure; and (e) a second coil positioned adjacent to said magnet which, when energized, imparts a third magnetic field to said permanent magnet structure for also imparting motion to said permanent magnet structure.

2. The device as in claim 1 further comprising a second rail positioned in a spaced apart relationship with said first rail, and both said rails disposed substantially parallel to each other and supported by said housing.

3. The device as in claim 2, wherein said permanent magnet structure is encased with a plastic having low friction characteristics, and said plastic is operatively supported by said rails for providing substantially unrestricted movement of said magnet along said rails.

4. The device as in claim 3, wherein said housing includes a generally U-shaped cross section, and said first and second rails are respectively disposed through opposite ends of said support structure.

5. The device as in claim 4, wherein said housing includes two walls in a substantially parallel, spaced apart relationship, and said rails extend respectively through said walls in a spaced apart, substantially parallel relationship with each other.

6. The device as in claim 5 further comprising two posts respectively disposed in each wall for assisting in providing rapid movement of said magnet along said first and second rails.

7. The device as in claim 1 further comprising two sensors positioned in proximity to said magnet structure for cooperatively detecting the position of said magnet structure, and for controlling the direction of current in said first and second coils.

8. The device as in claim 7 further comprising two pads respectively positioned on opposite sides of said housing for absorbing the impact of said magnetic structure to the housing during the movement of said magnet structure.

9. The device as in claim 7, wherein said sensors are Hall sensors.

\* \* \* \* \*